(12) United States Patent
Johnson et al.

(10) Patent No.: US 8,340,625 B1
(45) Date of Patent: Dec. 25, 2012

(54) ALTERNATIVE TECHNIQUES FOR PROCESSING WIRELESS COMMUNICATION BACKHAUL

(75) Inventors: Harold Johnson, Roach, MO (US);
Timothy Euler, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 841 days.

(21) Appl. No.: 11/758,946

(22) Filed: Jun. 6, 2007

(51) Int. Cl.
*H04M 9/00* (2006.01)
(52) U.S. Cl. ........ 455/402; 455/436; 455/450; 455/512; 370/242; 370/252; 370/338; 370/392; 370/431; 370/328; 370/329; 370/331; 370/332; 370/348; 370/352; 370/356; 370/363; 370/368; 370/371; 370/382; 370/383; 726/4; 725/117; 725/105; 725/124; 725/125; 725/111; 725/114; 725/118; 725/130; 375/220; 375/377; 375/222; 375/219; 375/230
(58) Field of Classification Search .................. 455/402, 455/436, 450, 512; 370/242, 252, 338, 392, 370/329, 431, 328, 331, 332, 348, 352, 356, 370/363, 368, 371, 382, 383; 726/4; 725/117, 725/105, 124, 125, 111, 114, 118, 130; 375/220, 375/377, 222, 219, 230
See application file for complete search history.

(56) References Cited

U.S. PATENT DOCUMENTS

| | | | | |
|---|---|---|---|---|
| 5,966,372 A | * | 10/1999 | Wright et al. | 370/329 |
| 6,948,184 B1 | * | 9/2005 | Del Sol et al. | 725/111 |
| 2007/0169162 A1 | * | 7/2007 | Kola | 725/117 |
| 2007/0286138 A1 | * | 12/2007 | Kaftan | 370/338 |

* cited by examiner

*Primary Examiner* — Charles Appiah
*Assistant Examiner* — Alexander Yi

(57) ABSTRACT

A method, system, and computer-readable media are provided for transmitting wireless data across a coaxial cable. In one aspect, a set of computer-readable media provides a method that includes receiving a request from a mobile device for data and transmitting the data across a coaxial cable to a cable modem. The method further includes sending the data to the mobile device through a base station, wherein the base station communicates with the cable modem in order to receive the data.

20 Claims, 4 Drawing Sheets

ALTERNATIVE TECHNIQUES FOR PROCESSING WIRELESS COMMUNICATION BACKHAUL

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter. The present invention is defined by the claims below. Embodiments of the present invention solve at least the above problems by providing a system, method, and computer readable media, among other things, for transmitting wireless communication data over a coaxial cable.

In a first aspect, a set of computer-readable media instructions provide a method that includes assigning a channel within a coaxial cable for communicating data to and from a mobile device. The method further includes retrieving a data item via the assigned channel through the coaxial cable that is coupled to a cable modem. Additionally, the method includes communicating the item of data to the mobile device.

In a second aspect, a system is disclosed that provides a base station controller configured to manage a plurality of base stations in a network, to receive communication data from content providers, and to receive requests for communication data from mobile devices. The system further includes a cable modem terminal system configured to manage a plurality of cable modems in a network and to transmit and receive communication data to and from the base station controller. Additionally, the system includes a coaxial cable with an assigned channel for transmitting and receiving the communication data to and from a mobile device. Furthermore, the system includes a cable modem configured to receive the communication data and process the communication data to and from the mobile device across the coaxial cable. Moreover, the system includes a base station configured to receive the communication data from the mobile device to send the communication data to the cable modem and to receive the communication data from the cable modem to send to the mobile device.

In a third aspect, a set of computer-readable media provides another method that includes receiving a request from a mobile device for communication data and transmitting the requested communication data across a coaxial cable to a cable modem. The method further includes sending the communication data to the mobile device through a base station, wherein the base station communicates with the cable modem in order to receive the communication data.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Further, various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
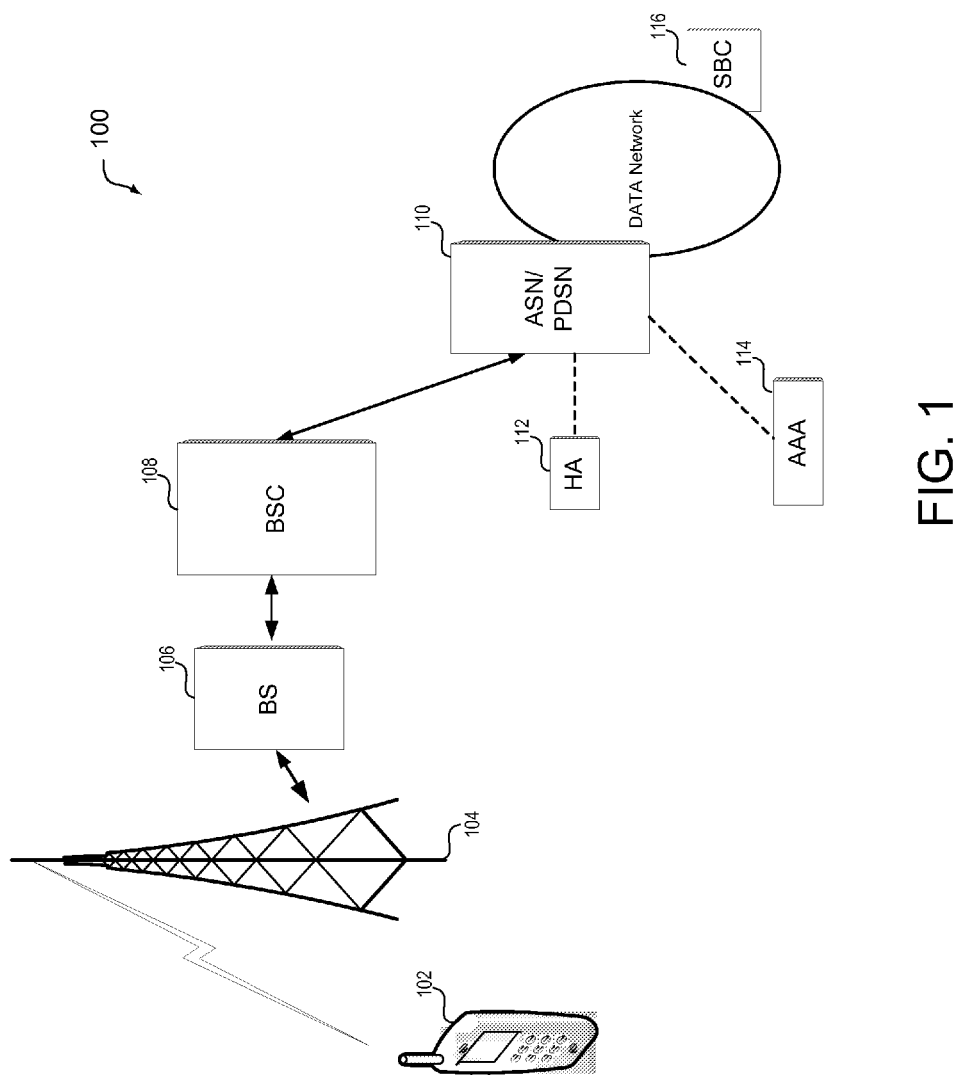
FIG. 1 is a block diagram of an embodiment of a communication network that can be employed by the invention.

FIG. 1 is a block diagram of an embodiment of a communication network 100 that can be employed by the invention. Mobile device 102 may be or can include a laptop computer, a network-enabled mobile telephone (with or without media capturing/playback capabilities), a wireless email client, a personal digital assistant (PDA), or other software client. The mobile device 102 may also include a machine or device to perform various tasks including video conferencing, web browsing, search, electronic mail (email) and other tasks, applications and functions. Mobile device 102 may additionally be a portable media device such as digital camera devices, digital video cameras (with or without still image capture functionality), media players such as personal music players and personal video players, and other portable media devices. The mobile device 102 can include a communication interface that can allow the mobile device 102 to transmit information via radio signals to a communication tower 104.

The Base Station (BS) 106 contains equipment for transmitting and receiving of radio signals from a communication tower 104. BS 106 also has other equipment for encrypting and decrypting communication with the Base Station Controller (BSC) 108. The BSC 108 may be configured to receive radio signals that are converted into Time Division Multiplexing (TDM) from a BS 106. In an embodiment, the BSC 108 can have a plurality of BSs under its control. The BSC 108 may handle the allocation of radio channels, may receive measurements from mobile devices, and can control handovers from one BS to another BS. Another function of the BSC 108 is to act as a concentrator of communication sessions where many different low capacity connections to the BSs (with relatively low utilization) become reduced to a smaller number of connections toward a Mobile Switching Center (MSC) (with a high level of utilization). The BSC may also be configured to send voice information from the TDM signal to the MSC and data information to an Access Service Network (ASN) or a Packet Data Serving Node (PDSN) 110.

The ASN/PDSN 110 may be a component of a mobile network. The ASN/PDSN 110 may act as a connection point between the Radio Access and Internet Protocol (IP) networks. The ASN/PDSN 110 component may be responsible for managing Point-to-Point Protocol (PPP) sessions between the mobile device's core IP network and the mobile device. The Home Agent (HA) 112 may be a router located in a home network of the mobile device 102. The HA 112 allows a mobile device to connect to the Internet or data network by assigning an IP address and binding it to a Care-of-Address (COA). The HA 112 can forward packets to an appropriate network when a mobile device is away from its home area or home network. An authentication, authorization, and accounting (AAA) server 114 is a server program that handles user requests for access to a network and provides AAA services. The AAA server 114 may interact with network access servers, gateway servers, databases, and directories containing user information. A Session Border Controller (SBC) 116 may be a device used in some Voice over Internet Protocol (VoIP) networks to exert control over the signaling and media streams involved in setting up, conducting, and tearing down calls. The SBC 116 may be put into the signaling and/or media path between the party making a call and the party receiving the call. In an embodiment, the SBC 116 may act as a VoIP phone when it receives a call from a calling party and can place a second call to the called party. The effect of this behavior may be that the signaling traffic and media traffic (voice, video, etc.) crosses the SBC. This behavior may also be prevalent during conference communications.

Figure 2:
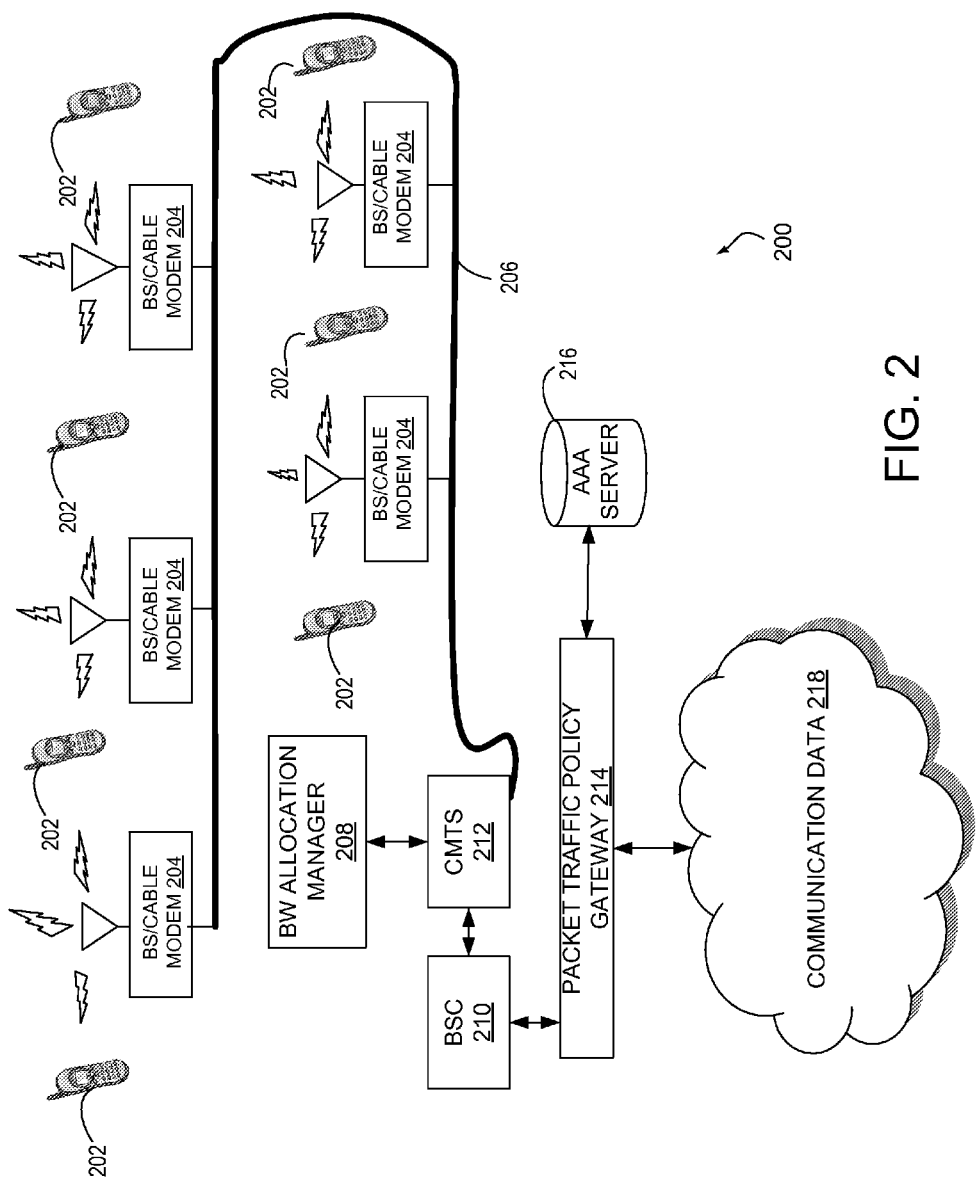
FIG. 2 is a block diagram of an exemplary system for implementing the invention according to an embodiment of the invention.

FIG. 2 is a block diagram of an exemplary system 200 for implementing the invention according to an embodiment of the invention. System 200 includes a plurality of mobile devices 202, a plurality of BSs 204 with cable modems, bandwidth allocation manager 208, BSC 210, cable modem terminal station (CMTS) 212, packet traffic policy gateway (PTPG) 214, and AAA server 216. PTPG 214 serves as a gateway from a wireless service provider's wireless network to the wireless service provider's wired network. In an embodiment, PTPG 214 is the same as ASN/PDSN 110. When the mobile device 202 attempts to authenticate itself onto the wireless network via the BS 204, the PTPG 214 will receive a MAC ID from the mobile device and a BS ID from the BS 204. The PTPG 214 can contact the AAA server 216 to determine whether or not it should allow the mobile device 202 to authenticate onto the wireless network from the location of the BS 204. The PTPG 214 can examine the AAA server 216 to see if both IDs are associated with each other within the database. If the PTPG 214 determines that the MAC ID and BS ID are not associated with each other, meaning that the mobile device 202 is not authorized to receive service at the location of the BS 204, then the mobile device's request to authenticate onto the network is denied. However, if the PTPG 214 determines that the MAC ID and BS ID are associated with each other, meaning that the mobile device 202 is authorized to receive service at the location of the BS 204, then the mobile device's request to authenticate onto the network is allowed. Once the mobile device 202 is authenticated, the mobile device can obtain Internet Protocol (IP) connectivity by requesting an IP address from the network by sending a Dynamic Host Configuration Protocol (DHCP) to the network of the service provider. The network then allocates an IP address for the mobile device 202 and sends the IP address to the mobile device. The mobile device 202 thereby has obtained a Radio Frequency (RF) connection and an IP address and can now obtain communication data such as VoIP, Internet access over the network, multimedia content including text, video, and audio content, or any other IP services that the user registered to receive.

BSC 210 is the same as BSC 108 and manages the plurality of BSs 204. In an embodiment, BSC 210 transmits communication data 218 received from content providers of the communication data to CMTS 212 and receives communication data 218 from mobile devices 202 via CMTS 212. In an embodiment, the BSC 210 can transmit communication data 218 received from content providers directly to BS 204 without sending the communication data to CMTS 212. The BSC 210 can also transmit communication data 218 received from a mobile device 202 to another mobile device, a content provider, an MSC, or any other device/server that can process the communication data 218.

In an embodiment, each BS 204 includes a cable modem. As shown, the cable modem may be a component of the BS. However, in other embodiments, the cable modem is a separate component that is at a location separate from the BS. CMTS 212 is a computer hardware and/or software component that is used to manage the plurality of cable modems. CMTS 212 collects and processes all communication data traffic received from mobile devices that have been processed by cable modems under its control. In an embodiment, CMTS 212 and BSC 210 can be configured into one unit. CMTS 212 communicates with each of the cable modems over coaxial cable 206.

In an embodiment, CMTS 212, coaxial cable 206, and each of the cable modems are managed by a cable network operator that is separate from the wireless service provider. A cable network operator, such as Comcast for example, may traditionally use CMTS 212, coaxial cable 206, and the cable modems to provide Internet, VoIP, and cable television service to subscribed users. In such an embodiment, the CMTS 212, coaxial cable 206, and cable modems may be components of a Data Over Cable Service Interface Specification (DOCSIS) infrastructure of the cable network operator.

The invention incorporates the new infrastructure of the CMTS 212, coaxial cable 206, and cable modems into a wireless provider's network in order to facilitate the processing of cellular backhaul between a mobile device 202 and a wireless service provider's core network (an MSC for example). Such an infrastructure is used to replace the incumbent local exchange carrier (ILEC) T1 circuits that have been traditionally used to facilitate communication between the BS 204 and the BSC 210. The T1 circuits are being replaced with the new infrastructure in order to provide more bandwidth capacity for new wireless access technologies, such as Worldwide Interoperability for Microwave Access (WIMAX) or equivalent for example, at a cheaper cost than adding more T1 circuits.

In using the new infrastructure, the BSC 210 can transmit communication data 218 to CMTS 212, the CMTS can send the communication data to a cable modem over coaxial cable 206, the cable modem can transfer the communication data to BS 204, and the BS can then send the communication data to the mobile device 202. When the mobile device 202 wants to send communication data to another mobile device, content provider, or other device/server, the mobile device can send the communication data to the BS 204, the BS can transfer the communication data to an associated cable modem, the cable modem can send the communication data across coaxial cable 206 to the CMTS 212, the CMTS can then transmit the communication data to BSC 210, and the BSC can then send the data to an MSC or directly to the other mobile device, content provider, or other device/server.

In an embodiment, coaxial cable 206 may be a cable dedicated to only transmit wireless communication data backhaul traffic between a mobile device and the wireless service provider's core network. In another embodiment, cable television programming and other services of a cable network operator are transmitted with the wireless communication data backhaul traffic within the same coaxial cable 206. In such an embodiment, a channel is assigned within the coaxial cable to only transmit the backhaul traffic between the mobile device and the wireless service provider's core network. The channel may be, for example, a 6 megahertz RF channel within the coaxial cable 206. In another embodiment, a first channel within the coaxial cable 206 is assigned to transmit communication data that only goes to the mobile device (downstream traffic), and a second channel is assigned to transmit communication data that only comes from the mobile device (upstream traffic). In such an embodiment, in order to efficiently process asymmetric traffic (more downstream traffic than upstream traffic), more bandwidth can be assigned to the first channel than the second channel. The first and second channels may also, for example, comprise 6 megahertz RF channels within the coaxial cable 206.

Bandwidth allocation manager 208 monitors traffic between BSs 204 and the core network and allocates bandwidth capacity within the assigned backhaul channel on-the-fly for each BS 204. Busy hour and busy minute conditions are different from BS to BS based on the movement of mobile devices 202 and the number of active users within each BS's coverage. Bandwidth allocation manager 208 measures the traffic activity and allocates backhaul bandwidth within the assigned backhaul channel for each BS 204 to maximize RF channel utilization and minimize wasting RF channel capacity on the system 200.

Figure 3:
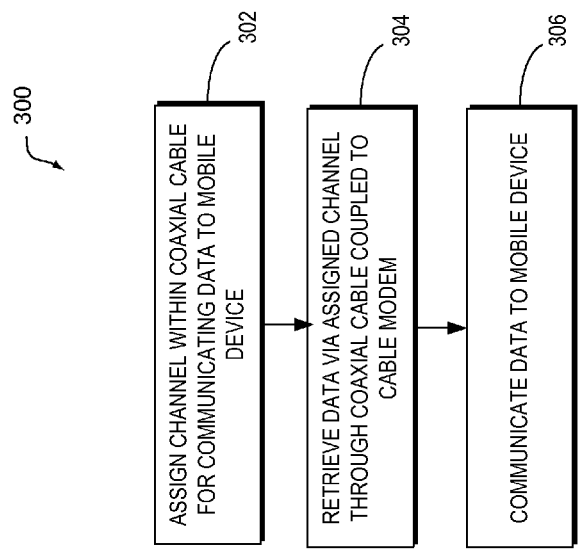
FIG. 3 is a flow diagram of an exemplary method for transmitting wireless communication data over a coaxial cable according to an embodiment of the invention.

FIG. 3 is a flow diagram of an exemplary method 300 for transmitting wireless communication data over a coaxial cable according to an embodiment of the invention. At operation 302, a channel is assigned within the coaxial cable for communication data transmitted and received to and from a plurality of mobile devices. In an embodiment, the assigned channel is a 6 megahertz RF channel. At operation 304, the communication data is retrieved via the assigned channel through the coaxial cable that is coupled to a cable modem. In an embodiment, the communication data is initially obtained by the cable modem from a CMTS from within the channel. At operation 306, the communication data is communicated to a mobile device.

Figure 4:
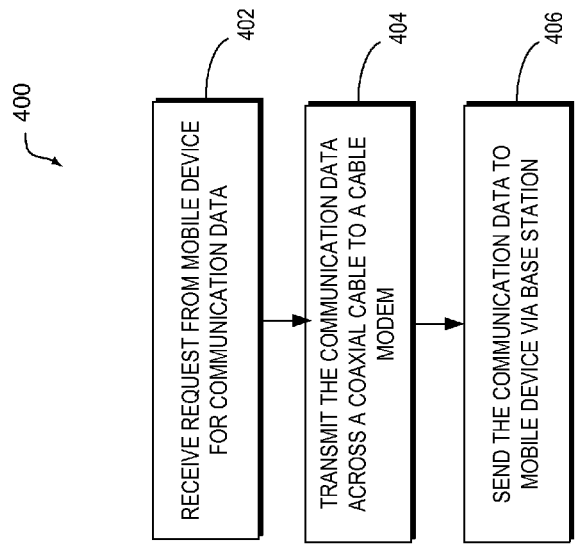
FIG. 4 is a flow diagram of another exemplary method for transmitting wireless communication data over a coaxial cable according to an embodiment of the invention.

FIG. 4 flow is a flow diagram of another exemplary method 400 for transmitting wireless communication data over a coaxial cable according to an embodiment of the invention. At operation 402, a request is received from a mobile device for one or more items of communication data. At operation 404, the communication data is transmitted across a coaxial cable to a cable modem. At operation 406, the communication data is sent to the mobile device through a base station, wherein the base station communicates with the cable modem in order to receive the communication data.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of transmitting wireless data over a coaxial cable, the method comprising:

receiving, at a base station (BS) comprising a cable modem, an authentication request that is useable by a wireless telecommunications network to determine that a mobile device is authorized to use the wireless telecommunications network, wherein the authentication request is received from the mobile device by way of a communication tower;

utilizing a coaxial cable coupled between the cable modem and a cable modem terminal station (CMTS) configured to manage a plurality of cable modems in a network and to transmit the following information from the base station to a base station controller (BSC), wherein the base station controller communicates the information to an authentication server:

(1) the authentication request, (2) a mobile-device identifier associated with the mobile device, and (3) a base-station identifier associated with the base station, wherein the authentication server authenticates the mobile device based on an association between the mobile-device identifier and the base-station identifier;

upon authentication of the mobile device, receiving, at the base station, an address request from the mobile device for an Internet Protocol (IP) address;

communicating the address request by way of the coaxial cable from the base station to the base station controller;

receiving at the base station the IP address from the base station controller by way of the coaxial cable;

communicating the IP address to the mobile device;

utilizing the coaxial cable to communicate data between the mobile device and the wireless telecommunications network; and monitoring traffic between one or more base stations and the wireless telecommunications network via a bandwidth allocation manager, wherein the bandwidth allocation manager:

processes asymmetric traffic by assigning more bandwidth to a first channel and less bandwidth to a second channel, measures the traffic activity; and allocates backhaul bandwidth within an assigned backhaul channel for each BS to maximize RF channel utilization and minimize wasting RF channel capacity.

2. The media according to claim 1, further comprising assigning at least one channel within the coaxial cable for communicating data to and from at least one mobile device and assigning bandwidth within the at least one channel for a plurality of base stations.

3. The media according to claim 1, wherein the coaxial cable is part of a cable network operator and the coaxial cable is configured to transmit wireless communication data backhaul traffic between a mobile device and the wireless telecommunications network or the coaxial cable is configured to transmit cable television programming and other services of the cable network operator that are transmitted with the wireless communication data.

4. The media according to claim 3, wherein the cable network operator uses a Data Over Cable Service Interface Specification infrastructure.

5. The media according to claim 1, wherein the cable modem obtains the at least one item of data from a cable modem terminal station.

6. The media according to claim 2, wherein a first channel is assigned for data traveling to the mobile device and a second channel is assigned for data traveling from the mobile device.

7. The media according to claim 6, wherein the assigned bandwidth of the first channel differs from the assigned bandwidth of the second channel.

8. A system for transmitting wireless data over a coaxial cable, comprising:
  a packet-traffic policy gateway that manages Point-to-Point Protocol (PPP) sessions between a mobile device's core IP network and the mobile device, configured to:
    (1) receive a mobile device MAC ID,
    (2) receive a base station identifier from a base station (BS) comprising a cable modem,
    (3) determine whether the mobile device MAC ID is associated with the base station identifier,
    (4) determine that the mobile device is authorized to receive service at the location of the base station when the mobile device MAC ID is associated with the base station identifier, and
    (5) determine that the mobile device is not authorized to receive service at the location of the base station when the mobile device MAC ID is not associated with the base station identifier;
  a base station controller that manages a plurality of base stations in the wireless network, receives data from one or more content providers, and receives requests for data from the mobile device;
  a cable modem terminal system configured to manage a plurality of cable modems in a network and to transmit and receive data to and from the base station controller (BSC);
the cable modem is configured to receive the data and process the data to and from the mobile device utilizing a coaxial cable, the coaxial cable comprising at least one assigned channel for transmitting and receiving the data to and from the mobile device; and
  a bandwidth allocation manager to monitor traffic activity and allocate backhaul bandwidth, wherein the bandwidth allocation manager:
measures the traffic activity; and allocates backhaul bandwidth within an assigned backhaul channel for each BS to maximize RF channel utilization and minimize wasting RF channel capacity; the base station that is configured to receive the data from the mobile device to send the data to the cable modem, and to receive the data from the cable modem to send to the mobile device.

9. The system according to claim 8, wherein the coaxial cable is part of a cable network operator and the coaxial cable is configured to transmit wireless communication data backhaul traffic between a mobile device and the wireless telecommunications network or the coaxial cable is configured to transmit cable television programming and other services of the cable network operator that are transmitted with the wireless communication data.

10. The system according to claim 9, wherein the cable network operator uses a Data Over Cable Service Interface Specification infrastructure.

11. The system according to claim 8, wherein a first channel is assigned for data traveling to the mobile device and a second channel is assigned for data traveling from the mobile device.

12. The system according to claim 11, wherein the bandwidth of the first channel differs from the bandwidth of the second channel.

13. One or more non-transitory computer-readable media having computer-useable instructions embodied thereon for performing a method of transmitting wireless data over a coaxial cable, the method comprising:
  receiving, at a base station (BS) comprising a cable modem, an authentication request that is useable by a wireless telecommunications network to determine that a mobile device is authorized to use the wireless telecommunications network, wherein the authentication request is received from the mobile device by way of a communication tower;
  utilizing a coaxial cable coupled between the cable modem and a cable modem terminal station (CMTS) configured to manage a plurality of cable modems in network and to transmit the following information from the base station to a base station controller, wherein the base station controller (BSC) communicates the information to an authentication server:
    (1) the authentication request,
    (2) a mobile-device identifier associated with the mobile device,
  and
    (3) a base-station identifier associated with the base station, wherein the authentication server authenticates the mobile device based on an association between the mobile-device identifier and the base-station identifier;
  upon authentication of the mobile device, receiving, at the base station, a request from the mobile device for one or more items of data;
  transmitting the one or more items of data from the base-station controller to the cable modem by way of the coaxial cable;
  sending the one or more items of data to the mobile device from the base station by way of a communication tower, wherein the base station communicates with the cable modem in order to receive the one or more items; and
  allocating backhaul bandwidth within an assigned backhaul channel via a bandwidth allocation manager wherein the bandwidth allocation manager:
  processes asymmetric traffic by assigning more bandwidth to a first channel and less bandwidth to a second channel; measures traffic activity; and allocates the backhaul bandwidth within the assigned backhaul channel for each BS to maximize RF channel utilization and minimize wasting RF channel capacity.

14. The media according to claim 13, wherein the one or more items of data are transmitted through a first channel within the coaxial cable, the first channel being assigned to only transmit data to one or more mobile devices.

15. The media according to claim 14, wherein the request is received by the base-station controller by way of the coaxial cable through a second channel within the coaxial cable, the second channel being assigned to only transmit data from the one or more mobile devices.

16. The media according to claim 15, wherein the bandwidth assigned to the first channel differs from the bandwidth assigned to the second channel.

17. The media according to claim 15, wherein the request is processed by the base station and then by the cable modem before being received across the coaxial cable.

18. The media according to claim 13, wherein the coaxial cable is part of a cable network operator and the coaxial cable is configured to transmit wireless communication data backhaul traffic between a mobile device and the wireless telecommunications network or the coaxial cable is configured to transmit cable television programming and other services of the cable network operator that are transmitted with the wireless communication data.

19. The media according to claim 18, wherein the cable network operator uses a Data Over Cable Service Interface Specification infrastructure, wherein the BSC transmit communication data to the CMTS, which sends the communication data over the coaxial cable to the cable modem, which transfers the communication data to the BS, which routes the communication data to the mobile device.

20. The media according to claim 1, wherein the BSC transmit communication data to the CMTS, which sends the communication data over the coaxial cable to the cable modem, which transfers the communication data to the BS, which routes the communication data to the mobile device.

* * * * *